United States Patent [19]
Funder et al.

[11] Patent Number: 5,620,251
[45] Date of Patent: Apr. 15, 1997

[54] COMPACTING GRANULATOR

[75] Inventors: Christian R. Funder, Fredensborg; Morten M. Hansen, Lyngby; Ove E. Hansen, Allerød; Torben Hein, Vanløse; Tage M. Larsen, Farum; Elo Nielsen, Albertslund, all of Denmark

[73] Assignee: Niro A/S, Soborg, Denmark

[21] Appl. No.: 481,400

[22] PCT Filed: May 15, 1995

[86] PCT No.: PCT/DK95/00190

§ 371 Date: Jun. 23, 1995

§ 102(e) Date: Jun. 23, 1995

[87] PCT Pub. No.: WO95/31276

PCT Pub. Date: Nov. 23, 1995

[30] Foreign Application Priority Data

May 16, 1994 [DK] Denmark ................. 0552/94

[51] Int. Cl.$^6$ ................. B01F 9/02; B01F 15/02
[52] U.S. Cl. ................. 366/169.1; 366/144; 366/221; 366/224
[58] Field of Search ................. 366/221–226, 366/230, 231, 233, 331, 309, 312, 167.1, 167.2, 168.1, 169.1, 169.2, 170.1, 171.1, 172.1, 173.1, 174.1, 175.1, 144

[56] References Cited

U.S. PATENT DOCUMENTS

| | | | |
|---|---|---|---|
| 3,528,781 | 9/1970 | Riggert | 366/221 |
| 3,988,114 | 10/1976 | Gorin | 366/224 |
| 4,046,496 | 9/1977 | Gorin | 366/221 |

*Primary Examiner*—Robert W. Jenkins
*Attorney, Agent, or Firm*—Sughrue, Mion, Zinn, Macpeak & Seas

[57] ABSTRACT

A compacting granulator for continuous, compacting granulation comprises a substantially horizontal rotatable drum, through which an eccentric shaft extends, which carries compacting means which partly transfer substantial amounts of energy to the granulate possible for attainment of a high degree of compacting, partly hurl up the material under treatment, so that the material, while hurled up, is brought in intimate contact with a treatment liquid sprayed through the nozzle. A stationary scraper as well as nozzles with individual feed supply ensures great flexibility and a reliable operation.

11 Claims, 1 Drawing Sheet

COMPACTING GRANULATOR

BACKGROUND OF THE INVENTION

The invention relates to a compacting granulator for continuous, compacting granulation and possible simultaneous mixing of at least one powdery or pasty material under supply of at least one fluid in a drum.

In many industries producing or handling powdery materials a granulating or agglomerating treatment is performed for making the materials less dusty, to increase their flowability, to make them easier to dose or in general easier to handle or to give them a desired appearance, by which treatment the primary particles and/or small agglomerate granules are united for the formation of bigger agglomerate granules. It may also be of interest to produce granulate on the basis of pasty starting materials, possibly with the addition of dry, powdery components.

Examples of such industrial branches, in which such processes take place, are the detergent industry, the fertilizer industry and the food, drink and tobacco industry as well as the pharmaceuticals industry and the metallurgical industry.

The attainment of agglomerated particles is achieved by use of widely differing measures either as part of a drying or production process or as a pre-treatment and by use of binding forces which are either present spontaneously or provided by the supply of suitable liquid or vaporous auxiliary means.

Many agglomeration processes, as for instance those performed in connection with a spray drying or a subsequent treatment in a fluidized bed, however, entail a reduction of the powder density of the material, also called the bulk weight, which in respect of a lot of products is undesirable, i.e. on account of increased packing and transport costs. To this may be added that the consumers wishes for instance within the detergent area tend to go towards more concentrated products, for the production of which components with relatively high powder density are used.

It is known that in connection with the selection of detergent components in a particular ratio, by mechanical treatment of the powdery material derived from spray drying by addition of a tenside acting as a binding agent, a detergent agglomerate with increased powder density is obtained, presumably because the mechanical treatment results in dense agglomerates with comparatively little interspace air between the primary particles.

Such a treatment is disclosed in published Danish Patent Application No. 1823/89, in which it is proposed to perform the agglomeration or the granulation while the material passes through a horizontal or slightly tilting mixing drum, in the interior of which a central, rotatable shaft is provided, the shaft carrying several radially directed impact tools. The mixing drum itself is stationary, and the passage of the material through the drum is therefore exclusively controlled by the impact tools.

Related apparatuses are known which have a horizontal, rotating mixing drum, in which a stirring shaft, which is parallel to the axis of the cylinder, but positioned under and at the side thereof, rotates in the same direction as the drum, see Japanese Patent Application 79-23438 (publication no. 80-116690). The described apparatus is for use in the manufacture of phosphate fertilizer with a surface layer of water-soluble phosphoric acid, the most important task being to distribute the liquid phosphoric acid on the phosphate granules. Inter alia as a consequence of the fact that the mixing shaft is adapted to rotate fairly slowly and that the design of the apparatus does not make an effective control possible of the staying time of the material in the apparatus and consequently the particle size, it will be obvious that this known apparatus is not suited for a real compacting granulation for the attainment of dense agglomerate particles with high density. Furthermore, the apparatus is not suited for treating material which consists of so small particles, that it is not flowing freely.

In addition to this many mixing apparatuses are known, in which large shear forces are exerted on the material to be mixed (high shear mixers) and which are provided with a fast rotating impeller, which apparatuses may also be used for agglomeration, for instance in connection with the spraying of a suitable liquid. However, it is here substantially the question of apparatuses working batchwise and which are less suited for industrial production on a large scale.

Within the detergent industry the apparatuses used for agglomeration and compacting comprise i.a. an apparatus which combines a mixing in a V-shaped chamber with the impact from an impeller. The compacting ability of these apparatuses does not, however, reach the desired level.

A granulator is required which combines the following properties or characteristics:

1. Continuous operation
2. The possibility of obtaining more compact agglomerates than can be obtained with known apparatuses with a single passage of the material to be treated
3. Big production capacity
4. The possibility of obtaining a narrow granule size distribution, and
5. General applicability for treatment of very differing materials without operational complications.

It has turned out that the possibility of meeting the requirements 2 and 4, i.e. the attainment of particularly compact agglomerates with narrow granule size distribution, does not solely have as a prerequisite that the mechanical conditions are present, in this respect the sufficient working energy, to obtain an effective compacting, but also to a very high extent the prerequisite of imparting to the material being treated a particularly homogenous moistening or contact with the agglomeration fluid used in the process.

In the known apparatuses of the type comprising a drum, the granulation fluid is introduced in form of a liquid or vapour, the latter being condensed on the powdery material, by means of nozzles which are either placed where the very powder mass is present during the operation of the apparatus or placed above the powder and adapted to distribute fluid on the surface formed by the powdery layer during its tumbling in the drum. Since the speed of the turning over of the powder is limited, the distribution of the liquid sprayed on or condensed becomes insufficient in the powder mass, the particles close to the surface of the powder layer being strongly moistened, whereas the particles positioned deeper in the powdery layer will have to participate in the tumbling process caused by the rotation of the drum for a long time before ending in the surface layer, where the moistening takes place. Thus, there are in the known apparatuses far from optimum conditions in respect of obtaining a homogenous moistening.

A more homogenous contact between the material in the drum and the agglomeration fluid blown in is achieved when this contact takes place while the material is projected in the air space in the drum, such that the powdery particles do not touch each other at the time of contact. As in the case in the known agglomeration processes in a fluidized bed, a considerably more homogenous moistening is obtained than would be the case if it took place while the particles were in mutual contact. When a particle projected in the air contacts a drop of liquid, the drop is evenly distributed on the surface of the particle. If, however, a drop of liquid hits a material which is in such a condition that the particles are in contact, the liquid will first and foremost penetrate into the interspaces between the particles and cause a very random and inhomogeneous conglomeration thereof.

This perception is used in the granulator according to the invention which better than any known apparatus is capable of meeting the combination of requirements listed above under 1–5. This granulator is according to the invention characteristic in comprising

SUMMARY OF INVENTION i) a drum rotatable around a substantially horizontal longitudinal axis, said drum having a length which is bigger than its diameter, and means for introducing pasty or powdery material at one end and means for removing granulate at the opposite end, (ii) a shaft extending parallel with the longitudinal axis of the drum through the length of the drum placed eccentrically in the drum in a level below the longitudinal axis of the drum and displaced laterally in the rotational direction of the bottom part of the drum relative to the vertical plane through the longitudinal axis, said shaft being at at least the major part of its length present in the drum provided with compacting means, the parts of which that are farthest away from the shaft passing, when the shaft is rotating, through an area near the part of the drum wall which is closest to the shaft, iv) means for rotating the drum around its longitudinal axis as well as means for rotating said shaft in the same direction and with a number of revolutions, which may be adjusted to a value which during the running of the granulator is from 10 to 1000 times bigger than the number of revolutions of the drum for hurling up the tumbled material present in the drum such that it is thrown through a path outside the area, where the product would be present in the drum, was it not influenced by the compacting means, iv) at least one scraper arranged stationarily in the drum for removing material from the inner wall of the drum for uniting it with material uphurled by the compacting means and v) at least one nozzle for distributing at least one fluid in the part of the drum which is passed by the material in uphurled state.

BRIEF DESCRIPTION OF THE PREFERRED EMBODIMENTS

Preferred embodiments and details of the granulator according to the invention are specified in the subclaims and explained in detail in the following with reference to the drawing, in which

Figure 1:
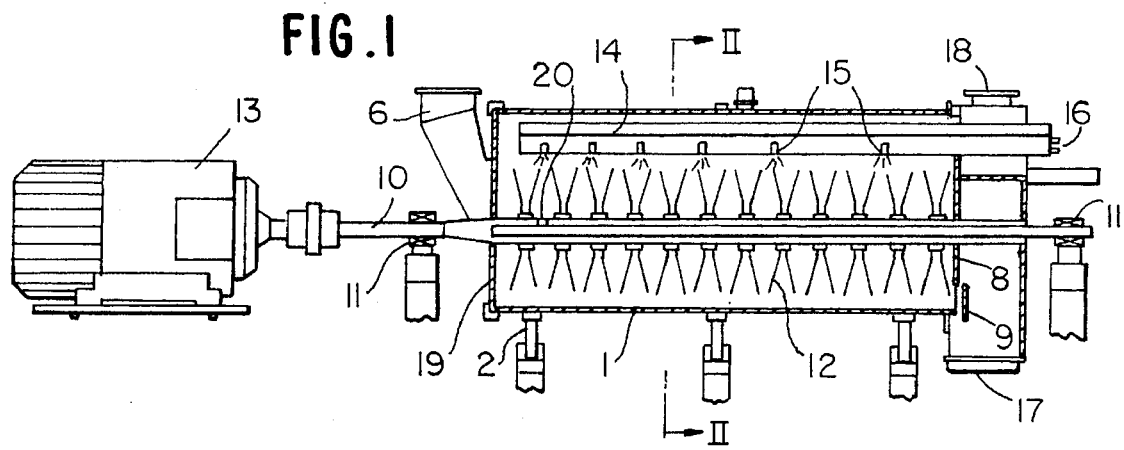
FIG. 1 is a very schematic longitudinal view through an embodiment of the granulator according to the invention, FIG. 2 schematically shows a cross-sectional view of the same embodiment from the place and seen in the direction which is indicated by the arrows II—II in FIG. 1.

The embodiment shown in the drawing of the granulator according to the invention comprises a circle-cylindrical drum 1 which is carried and controlled by rollers 2.

In the embodiment shown the drum is horizontal, but it may alternatively be supported having a slight inclination in the direction which in FIG. 1 is to the right, to further the passage through the drum of the material to be treated. A slight inclination in the opposite direction may be used for the attainment of a certain control of the filling degree of the drum, but this is, however, preferably ensured by other means which will be described below.

Figure 2:
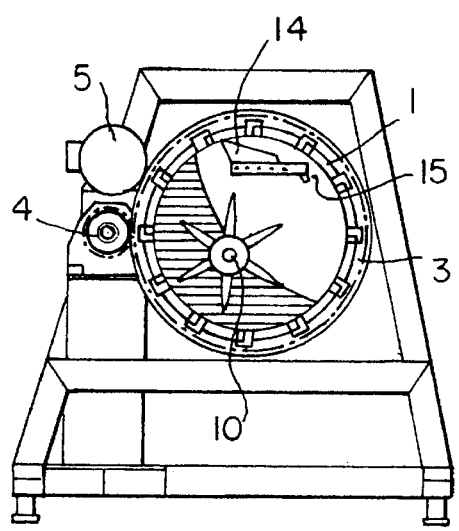

As will most distinctly be seen from FIG. 2 the drum is in the embodiment shown provided with a gear rim 3, and it is made to rotate by means of a toothed wheel 4 engaging the gear rim, said wheel being driven by an electromotor 5. The motor will typically be adapted during operation to give the drum a peripheral speed of 25–200 m/min, preferably approx. 50 m/min.

At one end of the drum inlet means 6 are provided for introducing pasty or powdery material, whereas the other end is provided with means for recovering of granulate, said means comprising an overflow edge 7, the level of which may be adjusted by displacement of shielding plates 8, and a lower slide gate 9 for removal of big granules and lumps as well as for the emptying of the drum.

The material introduced through 6 does not have to be in a dry, free flowing condition, but may be moist and for instance introduced in form of a filter cake, which will disintegrate in the drum. When the material is introduced as a paste, for instance metal oxides for use as pigment or as a component of technical ceramics, a dry, powdery material may be introduced simultaneously, the need for drying and consequently the energy consumption of the process as a whole being thereby reduced.

Through the drum 1 a shaft 10 extends parallel with the axis of the drum but eccentrically relative thereto, the shaft being supported at each end in bearings 11. The shaft 10 is positioned lower than the longitudinal axis of the drum and displaced laterally relative thereto, its position being in the zone, where the material will gather under influence from the rotation of the drum.

The shaft 10 is at substantially the whole length of the shaft which is present in the drum provided with compacting means 12, in the embodiment shown in form of arms, which by quick rotation of the shaft 10 exert a compacting, density increasing effect on the agglomerates present in the drum or being created therein. This compacting effect is of paramount importance since the necessary mixing and partly the agglomerating effect are obtained by the relatively slow rotation of the drum 1.

The shaft 10 is driven by an electromotor 13, which, as indicated by the dimensions used in FIG. 1, has a considerable strength and substantially bigger operating performance than the electromotor 5 running the drum 1.

For obtaining the desired compacting effect it is vital that the compacting means 12 have a surface substantially perpendicular to their travelling direction, and they may typically be designed as arms, which for the attainment of the necessary strength are designed with rectangular cross-section, the longest dimension of this being in the rotational direction.

In addition to the compacting effect on the material in the drum the compacting means 12 have the important function to bring about the projecting of the material particles, as outlined in FIG. 4, which is vital for the desired result and which will be explained in detail below.

In the drawing it is indicated that the shaft 10 is hollow, and it may at its end opposite the electromotor 13 be connected with means (not shown) for supply of one or more fluids.

From the hollow interior of the shaft this fluid may through openings or apertures 20, preferably in form of pressure nozzles, be led out into the drum for moistening of the particulate material present therein. The hollow shaft is in particular used for introducing cleaning liquid for cleaning the apparatus between periods of running. By using spreading nozzles a most effective rinsing is ensured.

In the upper part of the drum at least one scraper 14 is placed stationarily at a very small distance from the inner wall of the drum for removal of material therefrom.

In the embodiment shown the scraper carries a number of nozzles 15, which may be pressure nozzles or preferably two-fluid nozzles. The nozzles 15 are individually or groupwise connected to supply tubes 16 making the supply of fluid separately to individual nozzles or groups thereof possible. The supply tubes 16 are preferably surrounded by a heating jacket 21, which makes it possible to supply liquids which would solidify or become too viscous at ambient temperature.

Decisive for the attainment of the object of the invention is the positioning of the nozzles 15 in such a way that they deliver their fluid to the area of the drum, in which the treated material is present as particles, which are thrown up into the air without being mutually in contact.

Even though there is a possibility of using vapour or steam as agglomeration fluid, it is much more frequent, however, to use a liquid for that purpose, for which reason the following description is based on the assumption that the fluid is a liquid.

The preferred nozzle arrangement makes it possible to use sequential spraying, possibly of mutually incompatible liquids, such as aqueous solutions of hydrophillic compounds and solutions of hydrophobic compounds in organic solvents.

Figure 3:
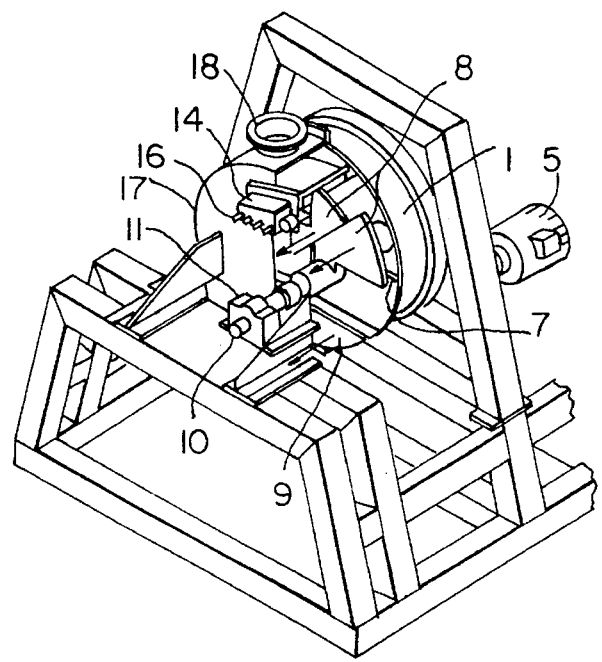
FIG. 3 is a perspective view of the outlet end for granulate, shown partly intersected, of the granulator shown in FIGS. 1 and 2.

In the embodiment shown the portion of the drum, which is shown to the right in FIG. 1, ends in a housing 17, which is shown partially cut away in FIG. 3. In the top of this housing an exhaust branch 18 is provided, through which by means of structure not shown a certain air exhaustion takes place during the operation of the apparatus. Hereby is achieved that a somewhat reduced pressure may be maintained, and this has the effect that dust in the connection between the drum and the housing 17 as well as between the drum and a cover 19 present in the opposite end is prevented, an inwardly directed air flow on these places preventing dust from the drum from reaching the gaskets (not shown).

Furthermore, the exhaustion through 18 results in an air flow in the drum which may be utilized for obtaining a cooling effect therein for partial removal of the thermal energy released by compacting.

As a supplement to or as an alternative to an exhaust as described a blowing in of compressed air may be used at the connection between the drum and the cover 19 or the housing 17 for preventing dust or particles from reaching the packaging means.

In a typical application of the granulator it is used for the production of a substantially dust-free detergent consisting of granules with desired size distribution and with considerable density, said detergent therefore having a big powder density. In a single passage of material a powder density for detergents of usual composition of more than 1.0 g/ml is obtained.

The starting material may for the major part be a spray-dried powder comprising most of the components being part of the end product, in particular components that are insoluble in water or other relevant solvents.

As a consequence of the intensive mixing which also takes place in the granulator according to the invention, it is not necessary for the detergent production that the starting material is unified in advance by spray-drying or the like, but the individual components may be added separately or as a coarse mechanical mixture.

The apparatus may also be used as a compacting, agglomerating reactor, for instance in connection with the dry-neutralizing process used in the detergent industry, in which case sulphonic acid is sprayed through one or more nozzles on soda which is tumbled and tossed in the drum.

Figure 4:
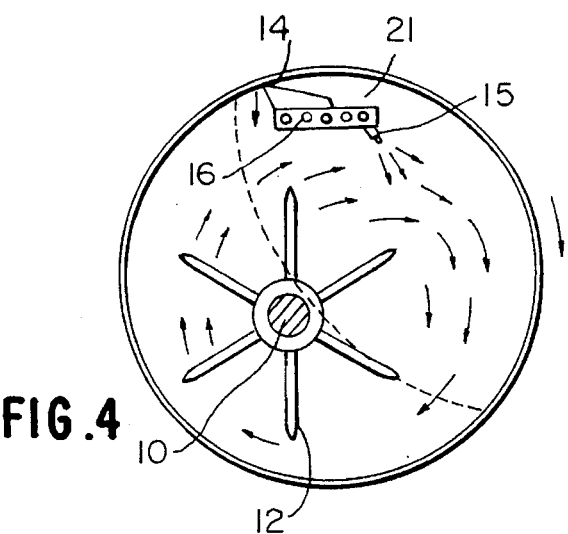
FIG. 4 is a draft showing the flow of the material in a cross-section of a granulator according to the invention with slightly changed construction in relation to the embodiment shown in FIGS. 1–3.

By using the granulator according to the invention the drum 1 is brought to rotate with the rotational direction shown in FIG. 4, following which introduction of the starting material into the drum is initiated through the inlet 6.

Were the shaft 10 with the compacting means 12 not present in the apparatus, the powdery starting material would place itself in the drum as indicated by the hatching in FIG. 2 and by the dotted line in FIG. 4.

Whereas the rotational speed of the drum as mentioned typically corresponds to a peripheral speed of approx. 50 m/min, the shaft 10 is brought to rotate by means of the strong electromotor 13 with a speed corresponding to a peripheral speed for the compacting means 12 of between 500 and 2000 m/min, which in addition to the compacting effect on the powder has the effect of throwing it in a steady flow up in the portion of the drum which on FIGS. 2 and 4 is shown on top to the right. This throwing is so comprehensive that the particles constantly flow like a carpet through the area in question, as indicated in FIG. 4.

While the particles are thus thrown through the air, they are exposed to the fluid sprayed in through the nozzles 15, and a more homogenous distribution of the fluid on the particles is obtained than would be the case if the contact between fluid and particles had been established while the particles were in mutual contact in the bottom portions of the drum.

Simultaneously with the compacting means 12 causing the in view of an even moistening most advantageous throwing up of the powdery material, said means exert a strong mechanical working, the agglomerates formed as a result of the moistening obtaining a high density with accompanying high mechanical strength and specific weight.

It should be observed that the flow pattern decisive for the attainment of the desired results is conditioned by the combination of the tumbling effect caused by the rotation of the drum and the projecting and compacting effect, which is exerted by the compacting means 12 mounted on the shaft 10.

When the moistened powder is exposed to the compacting effect exerted by the means 12 in co-operation with the inner surface of the drum 2, it will tend to adhere so strongly to the inner drum surface that it will not leave the drum merely by the influence of gravitational force during the rotation of the drum. It is therefore of importance that the scraper 14 ensures that the material is liberated from the drum and falls down for subsequently being thrown up for renewed moistening and subsequent compacting. Advantageously the scraper is for that reason placed above the shaft 10, the material liberated by the scraper falling directly down into the area passed by the compacting means.

When producing detergents and also many other products, it will be advantageous as liquid for introduction into the drum through the nozzles 15 to use a solution of a component desired in the end product, or an oily component which is capable of acting as a binding agent between the particles moistened by the solution.

Many materials and mixtures of materials will, however, have the inherent property that when just moistened with pure water or any other solvent they acquire such a tackiness that satisfactory agglomeration and subsequent compacting results are obtained.

In apparatuses of the type in question there is a risk that for instance an overdose of the supplied liquid results in sudden formation of big lumps which will strongly impede the operation and necessitate a time consuming disassembling and cleaning of the apparatus.

This risk is considerably reduced with the apparatus according to the invention due to the fact that the scraper 14 constantly removes any tacky deposits, which may appear on the interior wall of the drum, and causes them to fall down in an area, where they are influenced by the compacting means 12, which effectively will disintegrate such scraped off deposits.

With a view to the flowability of the products, their freedom for dust or suitability for pelleting, it may be desirable to provide the compacted granulate particles with a coating. This will by use of the apparatus be feasible in the compacting step, a solution suitable for producing the coating being directed to those of the nozzles 15 that are closest to the outlet opening, whereby a special coating pre-treatment is made superfluous.

As liquid supplied for the provision of or the supporting of the agglomeration and the subsequent compacting, liquids without solvent may be used in addition to the above-mentioned, i.e. either substances which are oily at normal temperature, or melted substances, the presence of which is desired or acceptable in the end product.

If the liquid comprises or consists of a solvent, including water, which is not bound by chemical reaction or crystallization processes, and the presence of which is undesirable in the end product, the treatment in the granulator according to the invention will normally be followed by a drying, typically in a fluidized bed.

Before removing the product obtained as compacted granulate from the drum, it may be advantageous to make a powdering (dust coating) thereof. For that purpose the coating powder may be introduced into the outlet end of the drum by means not shown, such as a worm or a pneumatic dosing system, which is passed through the stationary housing 17. This powder coating may take place in a substantial part of the length of the drum, for instance up to 75% thereof.

The removal of the compacted material from the drum takes place from the overflow edge 7, the effective height of which may be changed by displacement of the shielding plates 8. Thus it also becomes possible to regulate material level in the drum and consequently the average residence time of the material therein, which may be essential for the attainment of a desired granule size.

The granulate which passes the overflow edge 7 falls down into the bottom of the housing 17, from where it is removed for a possible after-treatment, like for instance said drying, or for direct packaging or for storage in a silo.

We claim:

1. A compacting granulator for continuous, compacting granulation and simultaneous mixing of at least one pasty or powdery material under supply of at least one fluid, characterized in comprising
   i) a drum (1) rotatable around a substantially horizontal longitudinal axis, said drum having a length which is bigger than its diameter, and means (6) for introducing pasty or powdery material at one end and means for removing granulate at the opposite end,
   (ii) a shaft (10) extending parallel with the longitudinal axis of the drum thought the length of the drum placed eccentrically in the drum (1) in a level below the longitudinal axis of the drum and displaced laterally in the rotational direction of the bottom part of the drum relative to the vertical plane through the longitudinal axis, said shaft being at at least the major part of its length present in the drum provided with compacting means (12), the parts of which that are farthest away from the shaft passing, when the shaft is rotating, through an area near the part of the drum wall which is closest to the shaft,
   iv) means (4,5) for rotating the drum (1) around its longitudinal axis as well as means (13) for adjustably rotating said shaft (10) in the same direction and with a number of revolutions, being a value which during the running of the granulator is from 10 to 1000 times bigger than the number of revolutions of the drum (1) for hurling up the tumbled material present in the drum such that it is thrown through a path outside the area, where the product would be present in the drum, was it not influenced by the compacting means,
   iv) at least one scraper (14) arranged stationarily in the drum for removing material from the inner wall of the drum for uniting it with material hurled up by the compacting means (12) and
   v) at least one nozzle (15) for distributing at least one fluid in the part of the drum which is passed by the material in uphurled up state.

2. A granulator according to claim 1, characterized in that the means of the drum for removal of granulate comprise a preferably adjustable overflow edge (7) for removal of product and a slide gate (9) for removal of big granules and lumps as well as for emptying of the granulator.

3. A granulator according to claim 1, characterized in that the shaft (10) carrying the compacting means (12) is at each end carried by a bearing (11) placed outside the drum.

4. A granulator according to claim 1, characterized in that the compacting means (12) placed on the shaft (10) are interchangeable arms.

5. A granulator according to claim 1, characterized in that the scraper (14) is positioned in the top part of the drum and has such length that substantially the whole inner surface of the drum, when the drum is rotating, passes the scraper and in that said at least one nozzle comprises a number of nozzles (15) distributed in the longitudinal direction of the drum, said nozzles being fixed to the scraper or a carrying structure therefor.

6. A granulator according to claim 5, characterized in that the nozzles (15) are provided with supply lines for liquid

(16) for separate liquid supply to each individual nozzle or groups of nozzles.

7. A granulator according to claim 6, characterized in that the supply pipes for liquid (16) are surrounded by heating jackets.

8. A granulator according to claim 1, characterized in that the shaft (10) provided with compacting means is hollow and has openings or nozzles for cleaning of the drum (1).

9. A granulator according to claim 1, characterized in that the means (4,5) for rotating the drum (1) are adapted to give the drum a peripheral speed of between 25 and 200 m/min, and in that the means (13) for rotating the shaft are adapted to do so with a speed corresponding to a peripheral speed of between 500 and 2000 m/min for the part of the compacting means (12) arranged on the shaft (10) which are farthest away from the shaft.

10. A granulator according to claim 1, characterized in having a cover at the end of the drum (1), where the means (6) for introduction of powdery material are positioned, and in that outflow of powder to the gasket means at the passage between said cover and the drum (1) is impeded by air being blown in or sucked into the drum, as well as means (18) for removal of said air at the opposite end of the drum, the air having exerted a cooling effect on the material present for treatment in the drum.

11. A granulator according to claim 9 wherein said drum has a peripheral speed of approximately 50 m/min.

* * * * *